Nov. 10, 1931.  J. MIHALYI  1,831,791
CAMERA SHUTTER
Filed March 28, 1930
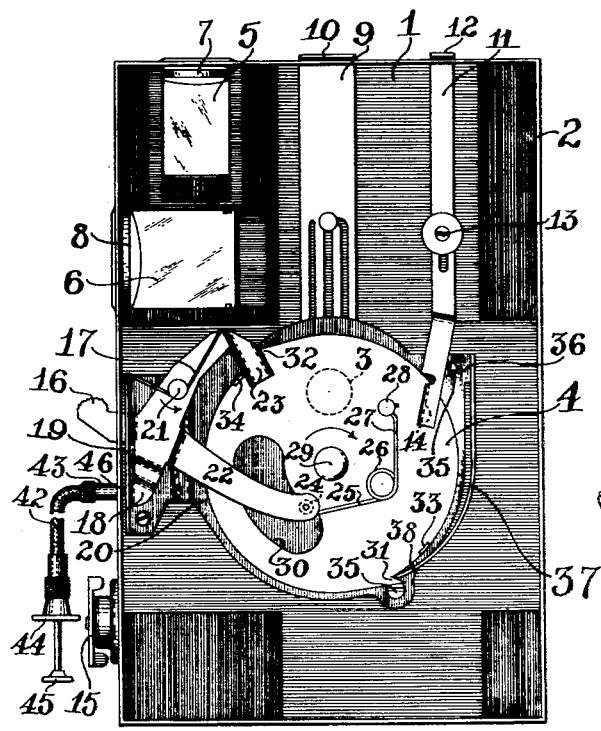
Fig. 1.
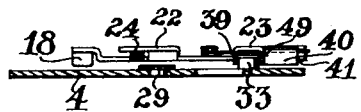
Fig. 5.
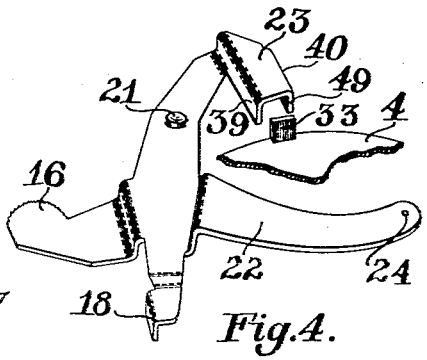
Fig. 4.
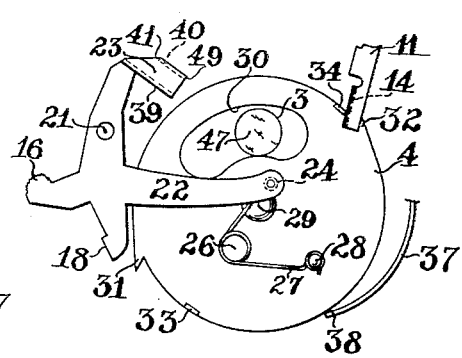
Fig. 3.
Fig. 2.
Joseph Mihalyi, Inventor.

Patented Nov. 10, 1931

1,831,791

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

CAMERA SHUTTER

Application filed March 28, 1930. Serial No. 439,696.

This invention relates to photography and more particularly to shutters for photographic cameras. One object of my invention is to provide an inexpensive simple type of camera particularly adapted for use in box type cameras. Another object of my invention is to provide a shutter having a minimum number of operating parts and having a shutter release which is movable in one direction at each actuation of the shutter. Another object of my invention is to provide a shutter trigger of the type which can be actuated with a cable release. Other objects will appear from the following specification, the novel features being particularly pointed out in the claims at the end thereof.

Coming now to the drawings wherein like reference characters denote like parts throughout:

Fig. 1 is a plan view of a well known type of box camera with the cover plate removed showing a shutter constructed in accordance with and embodying a preferred form of my invention;

Fig. 2 is a fragmentary view of the shutter parts removed from the camera and in a different position from that shown in Fig. 1;

Fig. 3 is a view similar to Fig. 2 but with the parts in position for time exposures;

Fig. 4 is an enlarged fragmentary detailed perspective view of the shutter trigger and a part of the shutter blade; and Fig. 5 is a fragmentary side elevation showing the shutter blade and the shutter trigger.

In the least expensive type of box camera it has been customary to provide a shutter in the form of a flat plate adapted to move back and forth over an aperture through which light passes to the camera lens to make an exposure. In order to move the shutter plate it has been customary to provide a trigger and spring, it being usually necessary to move the trigger in one direction for one exposure and to reverse the direction the trigger moves to make a second exposure.

In my present invention, however, the trigger is moved in the same direction each time an exposure is made. This is a useful improvement because it permits a cable release to be used on the camera and in addition it overcomes the tendency on the part of new camera operators to make an exposure by moving the shutter lever back and forth each time a single exposure is to be made. As indicated in Fig. 1 a box camera may be provided with a front plate 1 having a flange 2 extending around the periphery thereof. In the center of the front plate there is an opening 3 behind which the usual objective is placed, light passing through the opening 3 when permitted by a shutter blade 4 for making an exposure on a film.

The plate 1 may carry mirrors 5 and 6 together with viewing lenses 7 and 8 forming parts of the usual vertical and horizontal finders.

A lever 9 having a handle 10 on the exterior of the camera casing may be used to position different stops before the opening 3 in a well known manner and a second lever 11 having a handle 12 may extend to the exterior of the camera casing, this lever being slidable upon a stud 13 so as to position the formed-over flange 14 correctly with respect to the shutter blade 4 for making a time exposure as will be hereinafter more fully described.

On the exterior of the camera casing there may be the usual film winding key 15 and shutter triger 16, the latter differing from the standard type of trigger in that it is normally held by means of a spring 17 in the position shown in Fig. 1 in which position an arm 18 may rest against a flange 19 on a shutter plate 20 which may be affixed to the front board 1.

Coming now to my invention, the shutter trigger 16 may be pivoted on a stud 21 and may have arms 22 and 23, the former carrying a stud 24 to which is pivotally attached one end 25 of a hairpin spring 26, the other end of which 27 encircles a stud 28 carried by the shutter blade 4. The shutter blade 4 is pivoted on a stud 29 which extends through to the shutter plate 20 and on which the shutter blade 4 may freely rotate. The shutter blade is provided with the usual arcuate opening 30, this opening being adapted to pass by the aperture 3 and thus permit light to enter for an exposure.

The shutter blade 4 carries two hook shaped lugs or latches 31 and 32, these being roughly located on opposite sides of the pivot 29. Just behind each of these latches there is an upturned lug 33 and 34, that is, as best shown in Fig. 4 extending upwardly some distance from the shutter blade 4. It might be noted, however, that lug 32 is closer to the latch 34 than lug 33 is to latch 31.

The shutter plate 20 may be fastened to the front board 1 of the camera by means of a plurality of screws 35 and there is an offset portion 36 from which a spring arm 37 is bent upwardly into a position in which the end of the arm 38 may engage the latch members 31 and 32. These latch members normally prevent the shutter blade 4 from moving in counter-clockwise direction. This shutter blade under the influence of spring 26 normally tends to rotate in the direction shown by the arrow in Fig. 1 for successive exposures.

As best shown in Fig. 4 the arm 23 of the shutter lever is bent in to a U-shape in cross section, one side 39 constituting a stop for an upstanding lug 33 or 34 as indicated in Fig. 1 and the other side 40 being also adapted to limit the movement of one of these lugs as will be hereinafter more fully described.

With the parts in the position shown in Fig. 1, the shutter is in position to make an exposure by pressing down upon the trigger 16. The trigger is moved about the pivot 21 so that the lug 34 rides on wall 39 while the hairpin spring 26 is being placed under tension and when the trigger is moved a sufficient distance to permit the lug 34 to ride off the end of stop 39. The shutter blade will turn rapidly under the influence over the hairpin spring 26 from the position shown in Fig. 1 to the position shown in Fig. 2. This movement will cause the latch 32 to swing around past the end 38 of the spring 37 and a slight rearwardly movement of the shutter blade will cause latch 32 to become engaged with the spring arm 37 and hold the shutter blade in the position shown in Fig. 2.

In this position, of course, the trigger 16 has been depressed and the arcuate slot 30 has passed over the opening 3. When an operator releases trigger 16, spring 17 will swing the trigger back upon its pivot 21 into position shown in Fig. 1. This movement will, of course, move the lever 22 in such a way that the hairpin spring 26 will again be tensioned since the lug 33 will be engaged by the inner wall 40 of the shutter lever end 23.

The hairpin spring 26 is not sufficiently tensioned to move the shutter blade before the lug 33 passes between the walls 39 and 40 so that as the movement continues the spring tensioned and finally lug 33 slips off of the upper end 41 of wall 40 permitting the shutter to again turn in the same direction until latch 31 catches and is held by the end 38 of spring 37. Thus for each exposure the shutter blades move twice in the same direction and the trigger 16 moves to and from a position of rest, being moved from this position by means of an operator and being returned to this position as shown in Fig. 1 by means of a spring 17.

If desired instead of pressing on the trigger 16 a cable release 42 may be used. This cable release may be of a standard type having a ferrule 43 which screws into a suitable aperture in the camera wall and which is provided with the finger grips 44 and 45. Plunger 46 may contact with the turned over lug 18 best shown in Fig. 1.

In order to make time exposures the handle 12 of arm 11 may be drawn upwardly (with reference to Fig. 1) so that a bent over lug 14 will be moved into the path of a lug 33 or 34. With the lug in this position the trigger 16 may be pressed downwardly to make an exposure and the lug 34 may move from the position shown in Fig. 1 to the position shown in Fig. 3. In this position the hairpin spring 26 is under sufficient tension to hold the shutter blade 4 with the arcuate slot 30 lying over the opening 3 thus exposing the lens 47.

The trigger 16 is held down as long as is necessary to make the exposure and then is released. When released the lug 34 will swing backwardly and pass behind the end 41 of wall 40 so that it will be held by the wall 40 from further movement until the trigger 16 is again depressed.

Pressing in on the handle 12 will move the lug 14 from the path of the lugs 33 or 34 and after this has been done, "an instantaneous" exposure can be made with the lug held by the wall 40. By depressing the trigger 16, the hairpin spring 26 is tensioned until finally the lug slips off of the inside edge of wall 40 permitting the shutter to swing until the latch 32 is again engaged by the spring end 38.

It should be noted that this shutter consists of but few simple parts which can be made and assembled with a minimum number of operations.

While I have described and shown in the specification and drawings a preferred embodiment of my invention I contemplate as within the scope of my invention all such claims as may come within the terms of the appended claims.

Having thus described my invention, what I claim as new and desire to secure by Letters Patent is:

1. In a photographic shutter, the combination with a shutter blade having an opening therein, of means for driving said blade intermittently in one direction including a spring, a trigger connected to said spring for tensioning and releasing the spring and a stop for limiting the movement of the shutter blade.

2. In a photographic shutter, the combination with a shutter blade having an opening therein, of means for driving said blade intermittently in one direction including a spring adapted to move in two directions, means for setting the spring including a trigger, said trigger being adapted to move between two positions, and a spring for normally holding the trigger in one of the two positions.

3. In a photographic shutter, the combination with a shutter blade having an opening therein, of means for driving said blade intermittently in one direction including a spring, means for moving and tensioning the spring including a trigger, a spring tending to hold the trigger in a position of rest, said trigger being adapted to release the shutter to make an exposure when moved from its normal position of rest.

4. In a photographic shutter, the combination with a shutter blade having an opening therein, of means for driving said blade intermittently in one direction including a spring, said aperture in said shutter blade being positioned to make an exposure at every other movement of the shutter blade, a trigger for tensioning the spring, and a second spring for normally holding the trigger in one position, movable connections between the first mentioned spring and the trigger whereby the latter may be used to actuate the former.

5. In a photographic shutter, the combination with a shutter blade having an opening therein, of means for driving said blade intermittently in one direction including a spring, said aperture in said shutter blade being positioned to make an exposure at every other movement of the shutter blade, a trigger for tensioning the spring, cooperating stops on the shutter blade and trigger whereby said trigger may retain said shutter blade against movement while tensioning the spring and may release said shutter blade to make an exposure under the influence of said spring.

6. In a photographic shutter, the combination with a shutter blade having an opening therein of an actuating spring therefor, a shutter trigger, and means including a one way latch for preventing the shutter blade from moving in one direction, when actuated by the spring through the trigger.

7. In a photographic shutter, the combination with a shutter blade having an opening therein, a latch for preventing movement of the blade in one direction, a shutter trigger adapted to move in two directions, a spring connecting the trigger and the shutter blade adapted to drive the latter in one direction when tensioned by the trigger, through movement thereof in either of the two directions.

8. In a photographic shutter, the combination with a shutter blade having an opening therein, a latch for preventing movement of the blade in one direction, a shutter trigger adapted to move about a pivot in one direction for making an exposure, a spring connecting the trigger and shutter blade and adapted to be tensioned by the trigger, said shutter being moved twice in one direction for each exposure by said spring through a back and forth movement of the trigger.

9. In a photographic shutter, the combination with a shutter blade having an opening therein, a plurality of stops thereon, a latching device permitting movement of said shutter in one direction, a trigger, connections between said shutter blade and trigger including a spring, and slidable connections between the trigger and shutter blade whereby the shutter blade may be held against movement during the spring tensioning movement of the trigger.

10. In a photographic shutter, the combination with a pivoted shutter blade having an opening therein, means for preventing movement thereof in one direction, a trigger adapted to move in two directions, and connections between the trigger and the pivoted shutter blade including a spring adapted to be tensioned and released at each movement of the trigger in each direction.

11. In a photographic shutter, the combination with a pivoted shutter blade having an opening therein, of means to turn the blade upon its pivot including a spring, a trigger adapted to move in one direction for making an exposure and in a reverse direction without affecting said exposure, said trigger being connected to the shutter through the spring whereby said spring is tensioned and released for each movement of the trigger.

12. In a photographic shutter, the combination with a pivoted shutter blade having an opening therein, of means to turn the blade upon its pivot including a spring, a trigger adapted to move in one direction for making an exposure and in a reverse direction without affecting said exposure, a spring for normally holding said trigger in one position, said trigger, spring and shutter being interconnected in such a way that each movement of the trigger in different directions moves the shutter blade in the same direction.

Signed at Rochester, New York, this 21st day of March, 1930.

JOSEPH MIHALYI.